US007418012B2

(12) United States Patent
Busch

(10) Patent No.: US 7,418,012 B2
(45) Date of Patent: Aug. 26, 2008

(54) METHOD AND DEVICE FOR TIME-SYNCHRONIZED RELAYING OF SIGNALS

(75) Inventor: Hans-Jürgen Busch, Büchenbach (DE)

(73) Assignee: Grundig Multimedia B.V., Amsterdam (NL)

( * ) Notice: Subject to any disclaimer, the term of this patent is extended or adjusted under 35 U.S.C. 154(b) by 1108 days.

(21) Appl. No.: 10/311,569

(22) PCT Filed: Jun. 23, 2001

(86) PCT No.: PCT/EP01/07149

§ 371 (c)(1), (2), (4) Date: Dec. 24, 2002

(87) PCT Pub. No.: WO02/01878

PCT Pub. Date: Jan. 3, 2002

(65) Prior Publication Data

US 2004/0037325 A1 Feb. 26, 2004

(51) Int. Cl.
*H04J 3/06* (2006.01)
*H04L 7/00* (2006.01)
*H04L 25/00* (2006.01)
*H04L 25/40* (2006.01)

(52) U.S. Cl. ....................... 370/508; 370/519; 375/356; 375/371

(58) Field of Classification Search ....................... None
See application file for complete search history.

(56) References Cited

U.S. PATENT DOCUMENTS 4,963,967 A * 10/1990 Orland et al. ............... 348/484
5,570,372 A * 10/1996 Shaffer ....................... 370/468
5,621,774 A * 4/1997 Ishibashi et al. ............ 375/371
6,031,847 A * 2/2000 Collins et al. ............... 370/508
6,043,851 A * 3/2000 Sawada et al. .............. 348/512
6,249,319 B1 * 6/2001 Post ........................... 348/515
6,414,960 B1 * 7/2002 Kuhn et al. ............ 370/395.64

(Continued)

FOREIGN PATENT DOCUMENTS

GB 2 273 215 A 6/1994

(Continued)

OTHER PUBLICATIONS

Kirby D.G. et al: "A New Technique to Maintain Sound and Picture Synchronization", EBU Review-Technical, European Broadcasting Union, Brussels, XP 000670474, pp 13-21.

*Primary Examiner*—Kwang B. Yao
*Assistant Examiner*—Warner Wong
(74) *Attorney, Agent, or Firm*—Boyle Fredrickson, S.C.

(57) ABSTRACT

The invention relates to a method and device for the time-synchronised relaying of signals, whereby various signals from at least one signal source are relayed over various signal paths to at least one signal receiver, with time markers overlaid on the various signals. The delays occurring in the various signal paths are determined, a minimum total delay is calculated from the determined delays and information as to the minimal total delay is inserted in the various signals in the form of time-markers. A time-synchronous relaying of the signals is guaranteed in each signal path by means of an individual signal delay, the delay value of which corresponds to the difference between the minimal total delay and the delay caused by signal processing imposed on the signal in each signal path.

3 Claims, 2 Drawing Sheets

SIGNAL SOURCE 1 (1), TIME MARKS (2), SIG. PROC. UNIT (3), SIG. PROC. UNIT (4), TIME DELAY (5), SIGNAL SINK 1 (6), SIGNAL SOURCE 2 (7), TIME MARKS (8), SIG. PROC. UNIT (9), SIG. PROC. UNIT (10), TIME DELAY (11), SIGNAL SINK 2 (12), CONTROL UNIT (13), TIME BASE (14), SIG. PROC. UNIT (15), TIME DELAY (16), SIGNAL SINK 3 (17)

U.S. PATENT DOCUMENTS 6,414,971 B1 * 7/2002 James et al. ................ 370/519
6,480,902 B1 * 11/2002 Yuang et al. ................ 709/248
6,657,997 B1 * 12/2003 Lide et al. ................... 370/356
6,819,682 B1 * 11/2004 Rabenko et al. ............. 370/503
6,836,295 B1 * 12/2004 Cooper ....................... 348/515
6,891,573 B2 * 5/2005 Schreiber et al. ............ 348/518
7,020,894 B1 * 3/2006 Godwin et al. .............. 725/135
2001/0038674 A1 * 11/2001 Trans ......................... 375/355

FOREIGN PATENT DOCUMENTS

WO WO 99/52298 10/1999

* cited by examiner

METHOD AND DEVICE FOR TIME-SYNCHRONIZED RELAYING OF SIGNALS

BACKGROUND OF THE INVENTION

The invention is concerned with a method and a device for time-synchronous conduction of signals.

Such time-synchronous conduction of signals is of importance for example for audio/video systems and for multichannel audio systems. In those cases, there is always the necessity to have signals, transferred from one or several signal sources to one or several signal sinks through various signal paths, be conducted to the sink or sinks time-synchronously and to reproduce them there.

In case of conducting synchronous signals through asynchronous signal paths, time-synchronous conduction to the signal sinks can be achieved by introducing time marks into the data signal to be transferred. These introduced time markers are used at the end of an asynchronous path for conducting the signals correctly in time. The time marks are then removed again from the transferred data signal.

Known digital transfer systems are based on this principle. In these, by predetermining a reference model for the receiver, the occurring delay times and processing times are known, so that the sender or the signal source can calculate the time marks to be introduced into the data signals, using a common time basis and the known delay times or processing times. Systems which operate according to this procedure are described, for example, in the Standard IEC 13818 “Coding of moving pictures and associated audio” as well as in IEC 61883-4 “Consumer audio/video equipment—Digital interface—Part 4: MPEG data transmission”.

In the known procedure, it is a disadvantage that it can only be used if known signal processing paths are present, because a prerequisite is the presence of a reference model of the different data paths with the aid of which the occurring delay times and processing times can be determined.

Based on this state of the art, the task of the invention is to create a method or a device for time-synchronous conduction of signals which does not have the above disadvantages.

SUMMARY OF THE INVENTION

The advantages of the invention lie especially in the fact that time-synchronous conduction of signals transferred through various signal paths, which signals are subjected in these signal paths to different signal-processing- related delays, is ensured even when heterogeneous data paths are present. By determining the delays that occur in the various signal paths, which is preferably done individually for each process step, and the subsequent calculation of a minimum total delay, can take place at the site of application itself, within the framework of the first start-up of an installation and/or during running operation, with the aid of an installation-specific calculation of the minimum total delay. This calculated value can be updated either automatically at the given time intervals, automatically upon changing of the signal path or after the input of an operating command. As a result of that, even changes in the signal path architecture can be taken into consideration, for example, with an intermediate connection of other signal processing units or removal of signal processing units from the installation. By inserting information about the calculated minimum total delay into the data signal to be transferred, it is communicated to a delay unit arranged in the signal way before the signal sink as to which individual delay must be imposed on a signal transferred in the particular signal path in order to achieve that the signals transferred in all signal paths can be conducted time-synchronously to the sink or sinks.

Application of the claimed method and of claimed device can be used not only for audio/video systems and in multichannel audio systems, but, for example, also in other consumer electronics systems, home network systems and all other information transfer systems in which signals from at least one signal source have to be transferred through various signal paths to at least one signal sink and must arrive there time-synchronously.

BRIEF DESCRIPTION OF THE DPAWINGS

The invention will be explained in more detail below with the aid of a practical example, which is represented in the figures. The following are shown:

DETAILED DESCRIPTION

Figure 1:
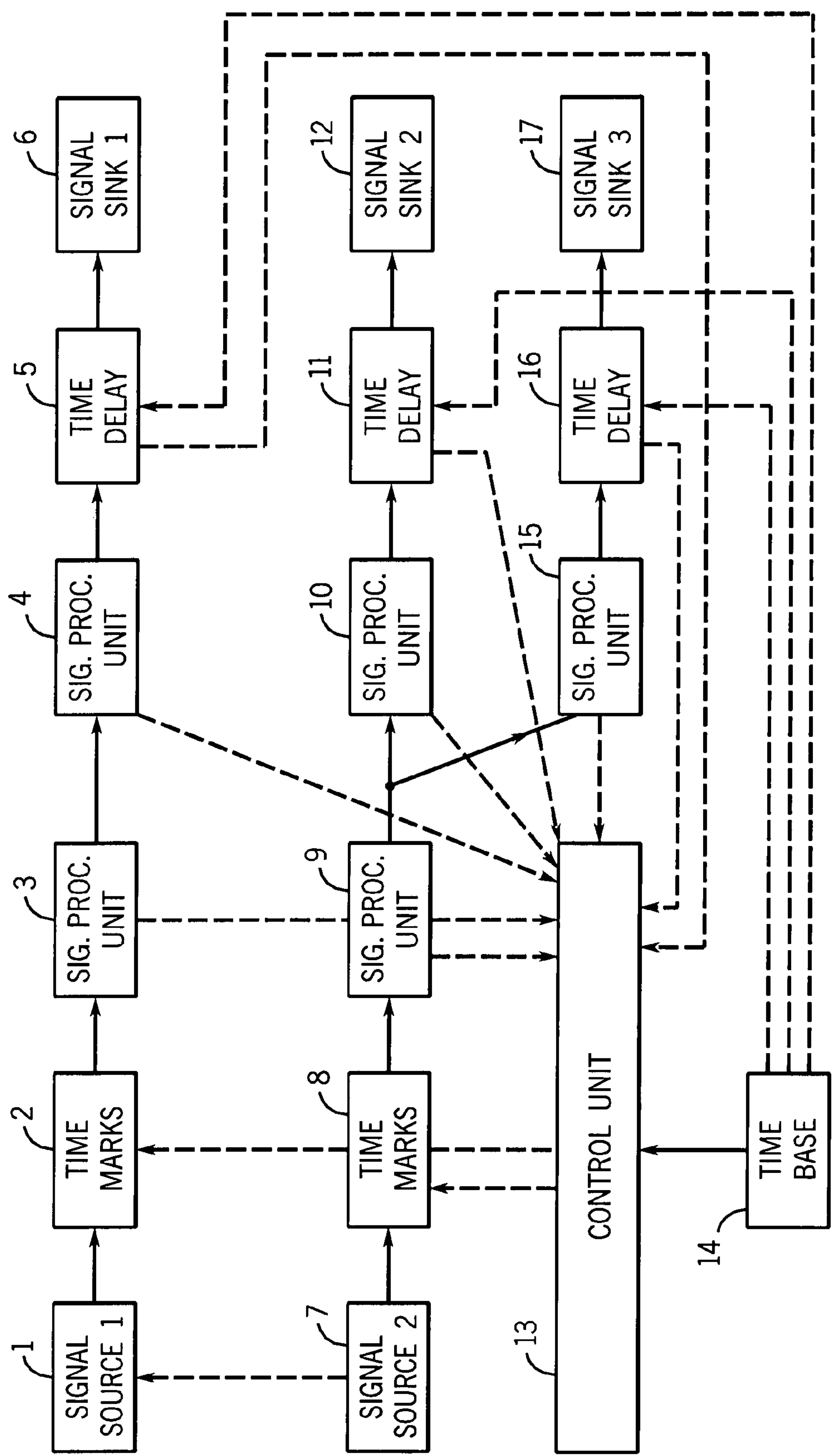
FIG. 1 is a device for time-synchronous conduction of signals.

FIG. 1 shows a device for time-synchronous conduction of signals operating according to the method of the invention.

The device shown has two signal sources 1, 7, the output signals of which must be transferred through various signal paths to signal sinks 6, 12, 17.

In the first signal path, which extends from the output of signal source 1 to the input of signal sink 6, one behind the other, are a device 2 for introducing time marks, a signal processing unit 3, a signal processing unit 4 and a delay unit 5.

The second signal path, which extends from the output of signal source 7 to the input of signal sink 12, contains, in sequence, a device 8 for introducing time marks, a signal processing unit 9, a signal processing unit 10 and a delay unit 11.

In the third signal path, which extends from the output of signal source 7 to the input of signal sink 17, a device 8 for introducing time marks, a signal processing unit 9, a signal processing unit 15 and a delay unit 16 are provided in sequence.

Furthermore, the device shown has a control unit 13, which is preferably a microcomputer. This is connected with a time base 14, which makes the control unit available for the entire device as time base signal serving as time base. Furthermore, the control unit 13 has one or several inputs through which the maximum possible delay time of the signal processing units 3, 4, 9, 10 and 15 can be queried. It is generally assumed that the individual signal processing units determine or know the delay time themselves. The information about a delay belonging to a signal processing unit can also be determined using time base information contained in the transferred signal, or, if a reference model is present, it can be known to the control unit a priori. In addition to the time base information contained in the transferred signal, for determination of the delay belonging to a signal processing unit, one can make use of delay values belonging to other signal processing units, stored in the control unit 13 previously.

For example, the time base information in signal source 1, made available by signal control unit 13, can be used as the first time mark in the output signal of signal source 1. The output signal of signal source 1 first runs through device 2 and then it is subjected to a signal processing procedure in signal processing unit 3, where a signal-processing-specific delay is imposed on the signal to be transferred. This signal-processing-specific delay value can be determined either in the signal processing circuit 3 by evaluation of the time base information, then informing the control unit 13, or it can be determined first in control unit 13 itself, which also has access to the time base.

The determined signal-processing-specific delay value, which is assigned to signal processing unit 3, is stored in control unit 13.

The output signal of signal processing unit 3 is introduced to signal processing unit 4 and there is subjected to another signal-processing-specific delay. This additional signal-processing-specific delay can be determined either in the signal-processing unit 4 itself, by evaluating the time base information and then provided to control unit 13, or it can be first determined in the control unit 13 itself, which also has access to the time base 14 and which also has information about the delay value assigned to signal processing unit 3.

The determined signal-processing-specific delay value, which is the basis of signal processing unit 4, is also stored in control unit 13.

By summation of the delay values assigned to signal processing units 3 and 4, the signal-processing-related delay occurring totally in the first signal path is determined in control unit 13, and stored as delay value. Similarly, the delays occurring in signal processing units 9 and 10 are determined and, by their summation, the total occurring delay in the second signal path is calculated and stored as delay value in control unit 13. Similarly, a determination of the delay occurring in signal processing unit 15 is done and by summation of the delays assigned to signal processing units 9 and 15, the total delay occurring in the third signal path is calculated and correspondingly stored in control unit 13.

Then, in control unit 13, a comparison of the total delays occurring in the three signal paths is performed with the purpose of determining a minimum total delay. The minimum total delay preferably corresponds to the maximum value of the delays occurring in the three signal paths, but it can also be chosen to be larger in order to have a time reservoir available.

Now, if it is ensured in each of the signal paths that the conduction of the particular signal to the corresponding signal sink takes place only at or after the end of the minimum total delay, and then time-synchronous conduction of the signals to signal sinks 6, 12, 17 can be achieved.

In order to achieve this, control unit 13 has time information available at an output which information contains the time base signal delayed by the minimum total delay. This signal is introduced to each of devices 2 and 8 and there it is entered into the signal to be transferred, originating from the particular signal source.

This information, together with the signal to be transferred, passes through the particular signal path and arrives to delay units 5, 11 and 16. These also have the time base signal of time base 14 available. The time information in the signal shows when the particular delay unit should further conduct the signal at the output. Thus, always an individual delay of the signal to be transferred occurs with a delay time which corresponds to the difference between the minimum total delay and the signal-processing-related delay imposed on the signal in the particular signal way. The delay unit of each signal path is arranged in the signal way between the signal source and the signal sink, preferably between the last signal processing unit of the particular signal way and the particular signal sink.

Figure 2:
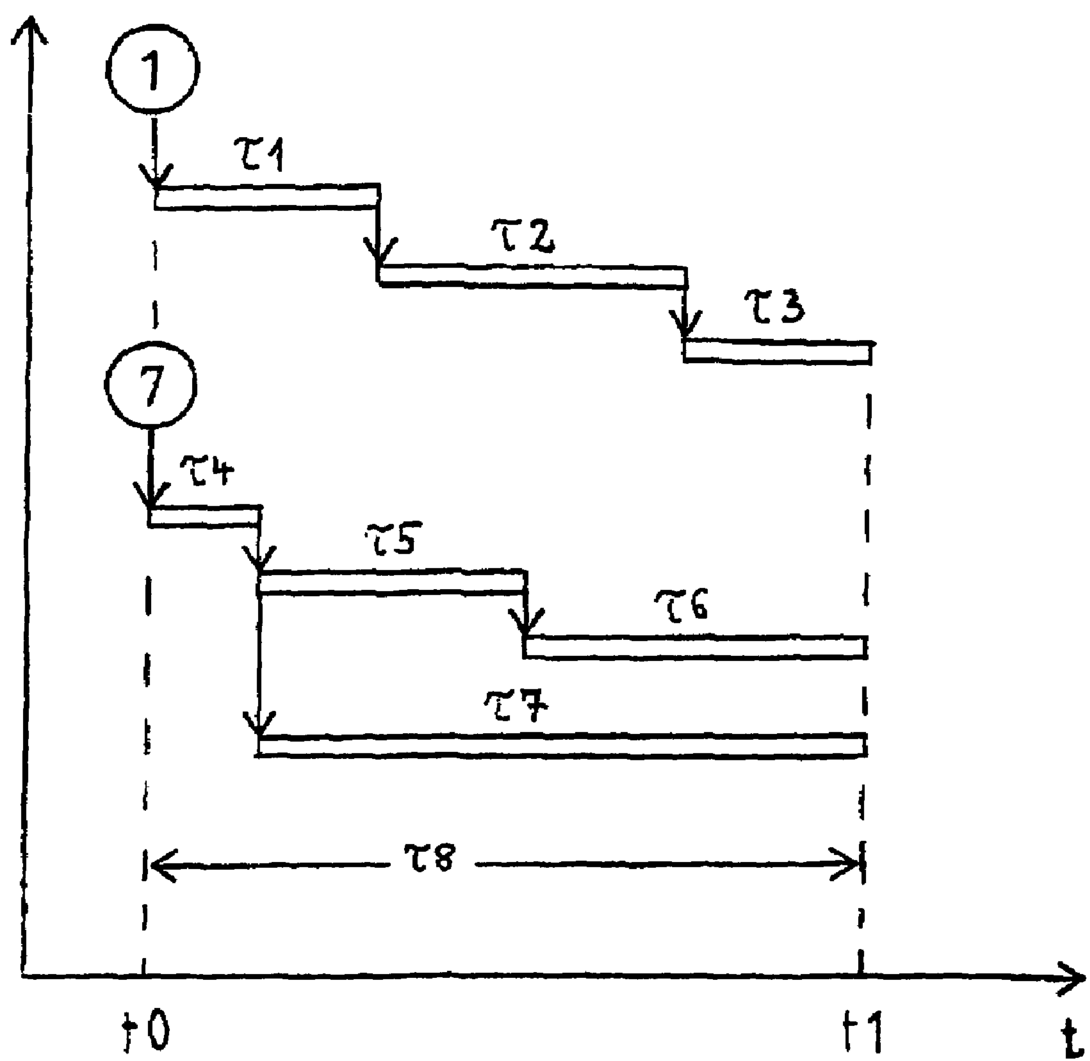
FIG. 2 is a corresponding delay diagram.

FIG. 2 shows a delay diagram which illustrates the time course of the device shown in FIG. 1.

In this diagram, it is assumed that the signal sources 1 and 7 make their output signals available at the same time at time point t0. This time synchronicity can be ensured by the control unit 13, which either starts the signal sources simultaneously, or introduces a common time base signal into the signal sources on the basis of which the signal sources begin with the output of the signal.

In the upper part of the diagram, the delays occurring in the first signal path are illustrated. Thus, $\tau1$ designates the delay time to which the signal to be transferred is subjected in signal processing unit 3 and $\tau2$ designates the delay time to which the signal to be transferred in signal processing unit 4 is subjected. The symbol $\tau3$ is that individual delay time which corresponds to the difference between the minimum total delay $\tau8$ and the sum of the delay times $\tau1$ and $\tau2$, so that:

$$\tau3=\tau8-(\tau1+\tau2).$$

The signal to be transferred in the first signal path in delay unit 5 is delayed by this individual delay time $\tau3$.

In the lower part of the diagram, the delays occurring in the second and third signal path are illustrated.

In the second signal path, $\tau4$ designates the particular delay time to which the signal to be transferred in signal processing unit 9 is subjected, and $\tau5$ designates the delay time to which the signal to be transferred in signal processing unit 10 is subjected. The symbol $\tau6$ is that individual delay time watch corresponds to the difference between the minimum total delay $\tau8$ and the sum of the delay times $\tau4$ and $\tau5$, that is:

$$\tau6=\tau8-(\tau4+\tau5).$$

The signal to be transferred in delay unit 11 is delayed by this individual delay time $\tau6$ in the second signal path.

In the third signal path, $\tau4$ designates the delay time to which the signal to be transferred in signal processing unit 9 is subjected and $\tau7$ designates the delay time to which the signal to be transferred in signal processing unit 15 is subjected. The individual delay time, which corresponds to the difference between the minimum total delay $\tau8$ and the sum of the delay times $\tau4$ and $\tau7$ is equal to zero in the practical example shown here. Consequently, after passing through signal processing unit 15, the signal transferred in the third signal path is not subjected to any further individual delay, since the sum of the signal-processing-related delays occurring in the third signal path corresponds to the minimum determined total delay.

After passage of the minimum total delay designated with $\tau8$, that is, at time t1, the output signals of the three signal paths are conducted further, time-synchronously, to the particular signal sink 6, 12 or 17.

According to an embodiment of the invention, which is not shown in the drawings, the minimum total delay is chosen to be greater than the sum of the signal-processing-related delays in the signal path that has the longest delay in this regard, in order to have a desired time reservoir with regard to the time-synchronous conduction of the signals. In this embodiment, an individual delay of the signal to be transferred occurs in each signal path.

Alternatively to the embodiment shown in FIG. 1, the insertion of time marks, which contain information about the minimum total delay, can also be done in the signal sources themselves.

Furthermore, these time marks, which contain information about the minimum total delay, can also be used for modification of the first time marks already contained in the signal, which were already introduced in the signal source into the signal to be transferred and, for example, contain information about the common time base.

In another embodiment, which is not shown in the figures either, the information about the minimum total delay is not introduced into the signal to be transferred, but, independently of this, is transmitted to the particular delay unit in which the creation of the individual signal delay occurs in order to produce time-synchronicity.

The calculation of the minimum total delay in the control unit can be done once during the start-up of the device in an initialization run, which is automatic or is triggered after the input of an operating command, and then can also be updated during later operation. This is of special importance when changes in the signal path architecture are produced, for example, by introducing or removing components from one or several of the signal paths. In these cases, the minimum total delay is newly calculated, which then will be the basis for the calculation of the individual delays occurring in the particular signal path. Moreover, a system according to the invention requires no reference model of the signal processing paths, with the aid of which the occurring delays can be measured, but it is only at the place where the system is used that the signal-processing-related delays occurring in the signal paths are determined and a calculation is carried out based on this, of an individual delay time with which the signal present in the particular signal path must be delayed in order to provide time-synchronous conduction of the signals transferred through the different signal paths.

The invention claimed is:

1. Device for the time synchronous conduction of signals, with at least one signal source, at least one signal sink, and several signal paths provided between the at least one signal source and the at least one signal sink, characterized by the fact that, furthermore, they contain means for the determination of the delays occurring in the various signal paths, means for the calculation of a minimum total delay from the determined delays, which minimum total delay is greater than or equal to the particular delay which occurs in the signal path with the largest delay, means for the control of the insertion of time marks, which contain information about the minimum total delay, into the different signals, and in each signal path there is a delay unit in which an individual delay is imposed on the signal transferred in the signal path, the delay corresponding to the difference between the minimum total delay and the signal-processing related delay that is imposed on the signal in this signal path;

characterized by the fact that the means for the determination of the delays occurring in the various signal paths, the means for calculation of the minimum total delay and the means for control of the insertion of the time marks are performed by a control unit and the control unit is connected to a time base;

wherein a signal-processing unit is arranged in one or several signal paths, in which the transferred signal is subjected to a signal-processing-specific delay and always one or several signal processing units are arranged in one or several signal paths, in which the transferred signal is always subjected to a signal-processing-related delay and each signal processing unit has an output which is connected to the input of the control unit;

wherein the device for introducing time marks is the signal source and the device for introducing time marks is arranged in the signal way, between the signal source and the signal sink, or the device for introducing time marks is arranged in the signal way, between the signal source and the first signal processing unit of this signal way; and wherein the control unit has an output at which time-base signals can be taken off, that the at least one signal source is provided for insertion of the first time marks derived from the time-base signals into the signal transferred through the signal path, and that the device arranged in the signal path between the signal source and the signal sink is provided for introducing time marks for modification of the first time marks.

2. Device according to claim 1, wherein the delay unit of each signal path is arranged in the signal way between the signal source and the signal sink.

3. Device according to claim 2, characterized in that the delay unit of each signal path is arranged in the signal way between a last signal processing unit of this signal path and the signal sink.

* * * * *